US007996343B2

(12) United States Patent
Zhao et al.

(10) Patent No.: US 7,996,343 B2
(45) Date of Patent: Aug. 9, 2011

(54) CLASSIFICATION VIA SEMI-RIEMANNIAN SPACES

(75) Inventors: Deli Zhao, Beijing (CN); Zhouchen Lin, Beijing (CN); Xiaoou Tang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 479 days.

(21) Appl. No.: 12/242,421

(22) Filed: Sep. 30, 2008

(65) Prior Publication Data

US 2010/0080450 A1    Apr. 1, 2010

(51) Int. Cl.
G06F 11/00 (2006.01)
(52) U.S. Cl. ......................................................... 706/12
(58) Field of Classification Search .................. 706/12, 706/20, 45–48
See application file for complete search history.

(56) References Cited

U.S. PATENT DOCUMENTS

| 7,010,167 | B1 | 3/2006 | Ordowski et al. | |
|---|---|---|---|---|
| 7,016,884 | B2 | 3/2006 | Platt et al. | |
| 7,203,346 | B2 | 4/2007 | Kim et al. | |
| 2004/0017947 | A1 | 1/2004 | Yang | |
| 2005/0163384 | A1 | 7/2005 | Avni et al. | |
| 2007/0160296 | A1 | 7/2007 | Lee et al. | |
| 2008/0014563 | A1 | 1/2008 | Visani et al. | |
| 2008/0016016 | A1 | 1/2008 | Mitarai et al. | |
| 2009/0297046 | A1* | 12/2009 | Zhao et al. | 382/224 |
| 2010/0067800 | A1* | 3/2010 | Lin et al. | 382/190 |
| 2010/0076723 | A1* | 3/2010 | Zhang et al. | 702/179 |
| 2010/0121792 | A1* | 5/2010 | Yang et al. | 706/12 |

FOREIGN PATENT DOCUMENTS

WO    2005101298 A2    10/2005

OTHER PUBLICATIONS

Zhao et al., Classifiaction via Semi-Riemannian Spaces, 2008, IEEE, pp. 1-8.*
Lu, et al., "Face Recognition Using LDA-Based Algorithms", IEEE Transactions on Neural Networks, vol. 14, No. 1, Jan. 2003, pp. 195-200.
Seong-Wook Joo, "Face Recognition using PCA and FDA with intensity normalization", Dec. 2003, 6 pages.
B. K Julsing, "Face Recognition with Local Binary Patterns", Bachelor Assignment, May 11, 2007, 57 pages.
Yu, et al., "A Direct LDA Algorithm for High Dimensional Data -with Application to Face Recognition", Sep. 29, 2000, pp. 1-3.
Tenenbaum, et al., "A Global Geometric Framework for Nonlinear Dimensionality Reduction", Apr. 4, 2007, 18 pages.
Jieping Ye, "A Two-Stage Linear Discriminant Analysis via QR-Decomposition", IEEE Transactions on Pattern Analysis and Machine Intelligence, vol. 27, No. 6, Jun. 2005, pp. 929-941.

(Continued)

*Primary Examiner* — David Vincent
(74) *Attorney, Agent, or Firm* — Westman, Champlin & Kelly P.A.

(57) ABSTRACT

Described is using semi-Riemannian geometry in supervised learning to learn a discriminant subspace for classification, e.g., labeled samples are used to learn the geometry of a semi-Riemannian submanifold. For a given sample, the K nearest classes of that sample are determined, along with the nearest samples that are in other classes, and the nearest samples in that sample's same class. The distances between these samples are computed, and used in computing a metric matrix. The metric matrix is used to compute a projection matrix that corresponds to the discriminant subspace. In online classification, as a new sample is received, it is projected into a feature space by use of the projection matrix and classified accordingly.

20 Claims, 4 Drawing Sheets

OTHER PUBLICATIONS

Wang, et al., "A Unified Framework for Subspace Face Recognition", IEEE Transactions on Pattern Analysis and Machine Intelligence, vol. 26, No. 9, Sep. 2004, pp. 1222-1228.

Finbarr O' Sullivan, "Discretized Laplacian Smoothing by Fourier Iviethods", Technical Report No. 162, Jun. 1989, 25 pages.

Wang, et al., "Dual-Space Linear Discriminant Analysis for Face Recognition", Proceedings of the 2004 IEEE Computer Society Conference on Computer Vision and Pattern Recognition (CVPR'04), 2004, 6 pages.

Li, et al., "Efficient and Robust Feature Extraction by Maximum Margin Criterion", Jan. 2006, pp. 1-18.

Belhumeur, et al., "Eigenfaces vs. Fisherfaces: Recognition Using Class Specific Linear Projection", IEEE Transactions Pattern Analysis and Machine Intelligence, vol. 19, Issue 7, Jul. 1997, pp. 711-720.

Ahonen, et al., "Face Description with Local Binary Patterns: Application to Face Recognition", IEEE Transactions on Pattern Analysis and Machine Intelligence, Jun. 5, 2006, pp. 1-15.

Qiu, et al., "Face Recognition by Stepwise Nonparametric Margin Maximum Criterion", Tenth IEEE International Conference on Computer Vision (ICCV'05) vol. 2, 2005, pp. 1567-1572.

He, et al., "Face Recognition Using Laplacianfaces", 2005, pp. 1-34.

Wang, et al., "Feature Extraction by Maximizing the Average Neighborhood Margin", Computer Vision and Pattern Recognition, CVPR '07, IEEE Conference (2007), pp. 1-8.

Howland, et al., "Generalizing Discriminant Analysis Using the Generalized Singular Value Decomposition", Apr. 7, 2003, pp. 1-23.

Yan, et al., "Graph Embedding: A General Framework for Dimensionality Reduction", IEEE Computer Society Conference on Computer Vision and Pattern Recognition, CVPR 2005, vol. 2, pp. 830-837.

Yang, et al., "KPCA Plus LDA: A Complete Kernel Fisher Discriminant Framework for Feature Extraction and Recognition", IEEE Transactions on Pattern Analysis and Machine Intelligence, vol. 27, No. 2, Feb. 2005, pp. 230-244.

Zhao, et al., "Laplacian PCA and Its Applications", ICCV'07, 2007, 8 pages.

Cai, et al., "Learning a Spatially Smooth Subspace for Face Recognition", IEEE Conference on Computer Vision and Pattern Recognition, CVPR '07, 2007, 7 pages.

Zhao, et al., "Linear Laplacian Discrimination for Feature Extraction", IEEE Conference on Computer Vision and Pattern Recognition, CVPR '07, 2007, pp. 1-7.

Wang, et al., "Local and Weighted Maximum Margin Discriminant Analysis", IEEE Conference on Computer Vision and Pattern Recognition, CVPR '07, Jun. 2007, pp. 1-8.

Roweis, et al., "Nonlinear Dimensionality Reduction by Locally Linear Embedding", Science Reports, vol. 290, Dec. 22, 2000, pp. 2323-2326.

Phillips, et al., "Overview of the Face Recognition Grand Challenge", IEEE Computer Society Conference on Computer Vision and Pattern Recognition, CVPR 2005, vol. 1, Jun. 2005, pp. 947-954.

Hastie, et al., "Penalized Discriminant Analysis", May 25, 1994, pp. 1-31.

Wang, et al., "Random Sampling for Subspace Face Recognition", International Journal of Computer Vision 70(1), 2006, pp. 91-104.

"Regularized Discriminant Analysis", Elements of Statistical Learning, Tibshirani and Friedman, 2001, Chapter 4, pp. 1-24.

Cai, et al., "Spectral Regression for Efficient Regularized Subspace Learning", IEEE 11th International Conference on Computer Vision, ICCV 2007, Oct. 2007, pp. 1-8.

Hastie, et al., "The Elements of Statistical Learning", Data Mining, Inference, and Prediction, Springer, 2001, 9 pages.

Fisher, et al., "The Statistical Utilization of Multiple Measurements", Annals of Eugenics, 8, 1938, pp. 130-143.

Wang, et al., "Trace Ratio vs. Ratio Trace for Dimensionality Reduction", IEEE Int. Conf. on Computer Vision and Pattern Recognition, 2007, 8 pages.

Martinez, et al., "Where Are Linear Feature Extraction Methods Applicable", IEEE Transaction on Pattern Analysis and Machine Intelligence, vol. 27, No. 12, 2005, pp. 1-20.

\* cited by examiner

CLASSIFICATION VIA SEMI-RIEMANNIAN SPACES

BACKGROUND

Classification is a fundamental task in pattern recognition. Linear discriminant analysis is often used for pattern recognition primarily because of its simplicity, consistent treatment, and performance.

Most of the existing work directed to the structural analysis of classes is based upon maximizing the ratio of the between-class scatter to the within-class scatter (this ratio is called the Fisher criterion). However, the singularity of the within-class scatter matrix (or its variants) usually leads to computational issues when performing the generalized eigen-value analysis that is performed to solve the linear discriminant problem. Recently, use of a discrepancy criterion (i.e., for maximizing the difference, rather than the ratio, between the between-class scatter and the within-class scatter) has been investigated to avoid the singularity problem of the Fisher criterion.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which semi-Riemannian geometry is used with a set of labeled samples (e.g., corresponding to supervised learning) to learn a discriminant subspace for classification. In one aspect, the labeled samples are used to learn the geometry of a semi-Riemannian submanifold.

In one aspect, for each sample of a set of samples, the K nearest classes corresponding to that sample are determined, along with the nearest samples to that sample that are in other classes, and the nearest samples to that sample that are within the same class as that sample. The distances between these samples are computed.

In one aspect, learning the discriminant subspace comprises computing a metric matrix, e.g., based on the computed distances between samples. In turn the metric matrix is used to compute a projection matrix that corresponds to the discriminant subspace.

In online classification, as a new sample is received, it is projected into a feature space by use of the projection matrix. The sample is classified based on this projection.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards applying semi-Riemannian geometry to supervised learning to generalize discrepancy criterion or criteria. To this end, learning a discriminant subspace for classification is based upon learning the geometry of a semi-Riemannian submanifold. As will be understood, this provides a different methodology for classification, which can avoid the singularity problem in the Fisher criterion-based algorithms, and also achieves improved and more stable classification performance.

It should be understood that any of the examples described herein are non-limiting examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and classification in general.

As will be understood, a discrepancy criterion can be interpreted using a language of semi-Riemannian geometry. Further, based on semi-Riemannian geometry, a more complete description of discrepancy criterion-based linear discrimination is provided herein. In one aspect, a new algorithm referred to herein as semi-Riemannian Discriminant Analysis (SRDA) is provided for supervised discriminant subspace learning.

Figure 1:
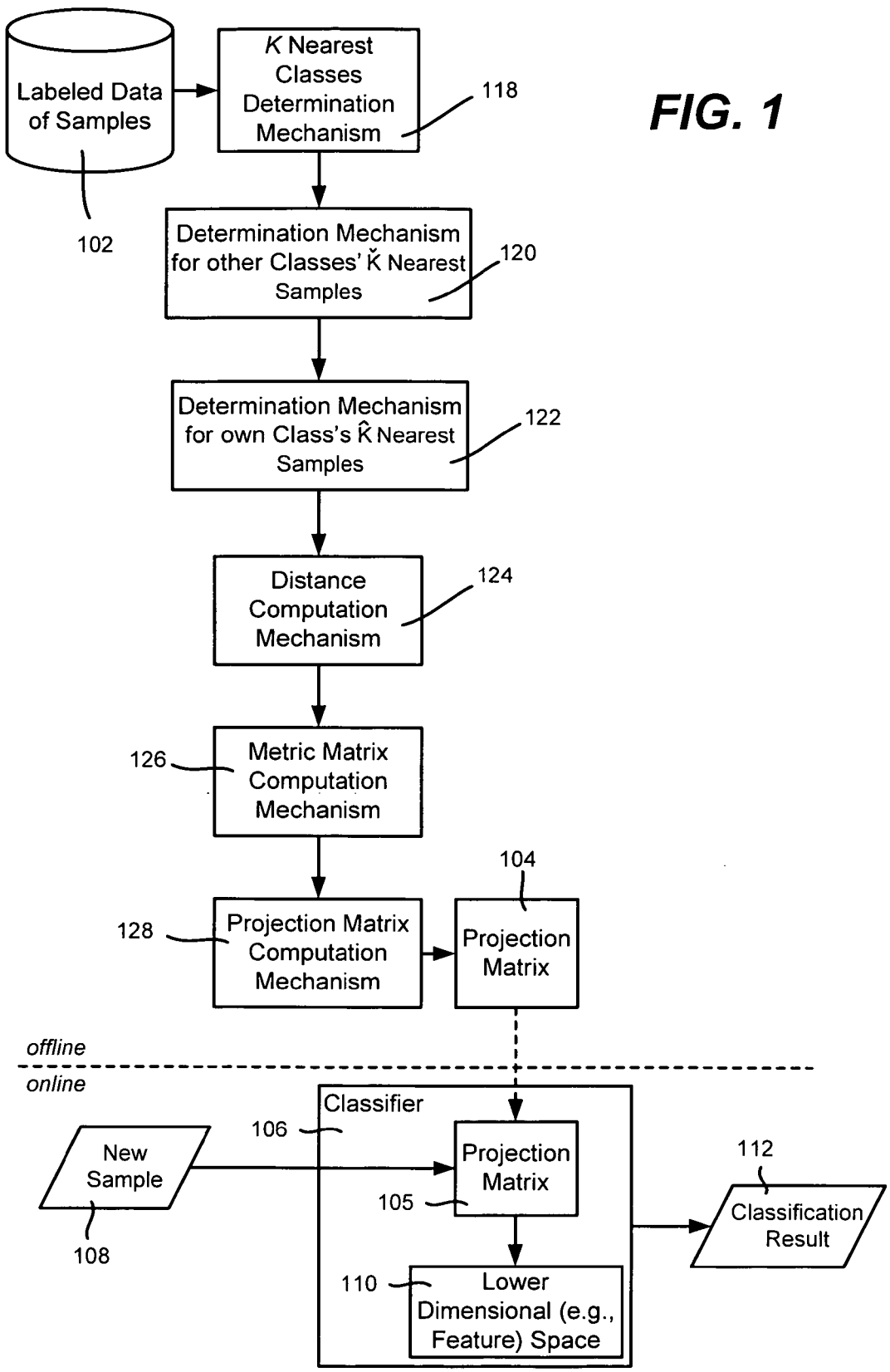
FIG. 1 is a block diagram showing example components for preparing and using semi-Riemannian spaces for classification.

FIG. 1 shows an example system for applying semi-Riemannian geometry to classification. In general, given a set of labeled samples 102, an offline process (offline with respect to classification) uses semi-Riemannian geometry to generate a projection matrix 104. An online copy of the projection matrix 105 is used by a classifier 106 to project a new sample 108 into a lower-dimensional (e.g., feature) space 110 to provide a classification result 112. Note that offline and online operations are optional, and are used herein to illustrate that computing the projection matrix need not be done in real time with respect to classification; classification may or may not be performed in real time depending on the purpose/type and so on of the classification being performed.

As will be understood and as described below, various components in the offline process compute the projection matrix 104. These include components/mechanisms for determining a sample's K nearest classes (block 118), for determining the nearest samples in other classes (block 120), for determining the nearest samples in the sample's own class (block 122), and for computing the distances between the sample and the other samples (block 124). Further provided is a metric matrix computation mechanism (block 126) and a projection matrix computation mechanism 128. The operations of each of these components are described below.

As set forth herein, what matters to the discrimination of a sample is its K nearest neighbor (KNN) classes, rather than all the available classes. Namely, the KNN classes of the sample dominate the capability of discrimination. Thus one aspect (blocks 118, 120 and 122) is directed to mining the structural relationship between a sample being evaluated and its KNN classes. These KNN classes provide K degrees of discriminability of the sample. The class to which this sample belongs also provides a degree of discriminability. Thus every sample is associated with (K+1) degrees of discriminability.

A sample may be viewed on a discriminant manifold of an intrinsic dimension (K+1). To provide the coordinate of that sample in the discriminant space within which the discriminant manifold resides, one approach uses the dissimilarities between the sample and several samples in each of its KNN classes and the class to which it belongs. More particularly, a dissimilarity vector of the dissimilarities between the sample and the chosen samples comprises the coordinate of this sample in the discriminant space. This discriminant space is the ambient space of the discriminant manifold described herein.

With respect to general fundamentals of semi-Riemannian geometry, the following table lists a number of mathematical notations used herein:

| | |
|---|---|
| tr(A) | The trace of the matrix A. |
| $A^T$ | The transpose of A. |
| $I_{p \times p}$ | The identity matrix of size p × p. |
| $e_p$ | The all-one column vector of length p. |
| $R^n$ | The n-dimensional Euclidean space. |
| $S_x^n$ | The n-dimensional original sample space. |
| $x_i$ | The i-th sample. $x_i \in S_x^n$. i = 1, . . . , m. |
| $S_x$ | $S_x = \{x_1, \ldots, x_m\}$. |
| X | $X = [x_1, \ldots, x_m]$. |
| $C_j$ | The j-th class, j = 1, . . . , c. |
| $\bar{x}_j$ | The centroid of class j. |
| $w(x_i)$ | The label of class that $x_i$ belongs to. |
| $\hat{x}_{i_k}$ | The $\hat{k}$-th neighbor of $x_i$ in $C_{w(x_i)}$. $\hat{k} = 1, \ldots, \hat{K}$ and $\hat{K} \leq |C_{w(x_i)}| - 1$. |
| $\check{x}_{i_k}^j$ | The $\check{k}$-th neighbor of $x_i$ in $C_j$. $\check{k} = 1, \ldots, \check{K}$ and $\check{K} \leq |C_j|$. |
| $\hat{S}_{x_i}$ | $\hat{S}_{x_i} = \{\hat{x}_{i_1}, \ldots, \hat{x}_{i_{\hat{K}}}, x_i\}$. |
| $\check{S}_{x_i}^j$ | $\check{S}_{x_i}^j = \{\check{x}_{i_1}^j, \ldots, \check{x}_{i_{\check{K}}}^j\}$. |
| $\check{S}_{x_i}$ | $\check{S}_{x_i} = \{\check{S}_{x_i}^1, \ldots, \check{S}_{x_i}^K\}$. |
| $S_{x_i}$ | $S_{x_i} = \{\hat{S}_{x_i}, \check{S}_{x_i}\}$. |
| $l_i$ | The index set of elements in $S_{x_i}$. |
| $\hat{Y}_i$ | $\hat{Y}_i = [\hat{y}_{i_1}, \ldots, \hat{y}_{i_{\hat{K}}}, y_i]$. |
| $\check{Y}_i^j$ | $\check{Y}_i^j = [\check{y}_{i_1}^j, \ldots, \check{y}_{i_{\check{K}}}^j]$. |
| $\check{Y}_i$ | $\check{Y}_i = [\check{Y}_i^1, \ldots, \check{Y}_i^K]$. |
| $Y_i$ | $Y_i = [\hat{Y}_i, \check{Y}_i]$. |
| $\hat{d}_{x_i, x_{i_k}}$ | The distance between $\hat{x}_i$ and $\hat{x}_{i_k}$. |
| $\check{d}_{x_i, x_{i_k}}^j$ | The distance between $\check{x}_i$ and $\check{x}_{i_k}^j$. |
| $\hat{d}_{x_i}$ | $\hat{d}_{x_i} = [\hat{d}_{x_i, x_{i_1}}, \ldots, \hat{d}_{x_i, x_{i_{\hat{K}}}}]^T$. |
| $\check{d}_{x_i}^j$ | $\check{d}_{x_i}^j = [\check{d}_{x_i, x_{i_1}}^j, \ldots, \check{d}_{x_i, x_{i_{\check{K}}}}^j]^T$. |
| $\check{d}_{x_i}$ | $\check{d}_{x_i} = [(\check{d}_{x_i}^1)^T, \ldots, (\check{d}_{x_i}^K)^T]^T$. |
| $d_{x_i}$ | $d_{x_i} = [\hat{d}_{x_i}^T, \check{d}_{x_i}^T]^T$. |
| $\hat{D}_{x_i}$ | $\hat{D}_{x_i} = \text{diag}((\hat{d}_{x_i, x_{i_1}})^2, \ldots, (\hat{d}_{x_i, x_{i_{\hat{K}}}})^2)$. |
| $\check{D}_{x_i}$ | $\check{D}_{x_i} = \text{diag}((\check{d}_{x_i, x_{i_1}})^2, \ldots, (\check{d}_{x_i, x_{i_{\check{K}}}})^2, \ldots, (\check{d}_{x_i, x_{i_{\check{K}}}}^K)^2)$. |

Semi-Riemannian geometry is the geometry of semi-Riemannian manifolds, in which semi-Riemannian manifolds are smooth manifolds equipped with semi-Riemannian metric tensors. The metric matrix of a semi-Riemannian space $N_v^n$ is of the form:

$$G = \begin{bmatrix} \check{\Lambda}_{p \times p} & 0 \\ 0 & -\hat{\Lambda}_{v \times v} \end{bmatrix},$$

where $\check{\Lambda}_{p \times p}$ and $\hat{\Lambda}_{v \times v}$ are diagonal and their diagonal entries are all positive, and n=p+v. v is called the index of $N_v^n$. Suppose that $r=[\check{r}^T, \hat{r}^T]^T$ is a vector in $N_v^n$, then its norm with respect to the metric G is:

$$g(r,r) = r^T G r = \check{r}^T \check{\Lambda} \check{r} - \hat{r}^T \hat{\Lambda} \hat{r}$$

The vector r is called space-like if g(r,r)>0 or r=0, time-like if g(r,r)<0, and null if g(r,r)=0 and r≠0.

With respect to learning on the semi-Riemannian manifold, given the above-described geometrization of class structures, learning a discriminant subspace reduces to learning the geometry of a semi-Riemannian manifold. In one implementation, this is accomplished in two general steps. A first step determines the metric tensors of the ambient discriminant space. A second step determines the linear projection matrix (step 314 of FIG. 3) that computes the discriminant features for classification.

The metric tensor is leaned based on the nullity of the ambient space, which is a characteristic of semi-Riemannian spaces, and based on the smoothness of some discrete functions. Once the metric tensor is determined, the projection matrix is found to maximize the sum of norms of the projected samples, measured by the metrics of the ambient space. Because of the structure of the metric of the ambient semi-Riemannian space, the sum of norms of the projected samples comprises the discrepancy of the between-class scatter and the within-class scatter of the projected samples.

Unlike traditional classification frameworks, the classification framework described herein models class structures as a semi-Riemannian submanifold embedded in an ambient semi-Riemannian space. As a result, as described above, learning a discriminant subspace for classification reduces to learning the geometry of the semi-Riemannian submanifold.

Figure 2:
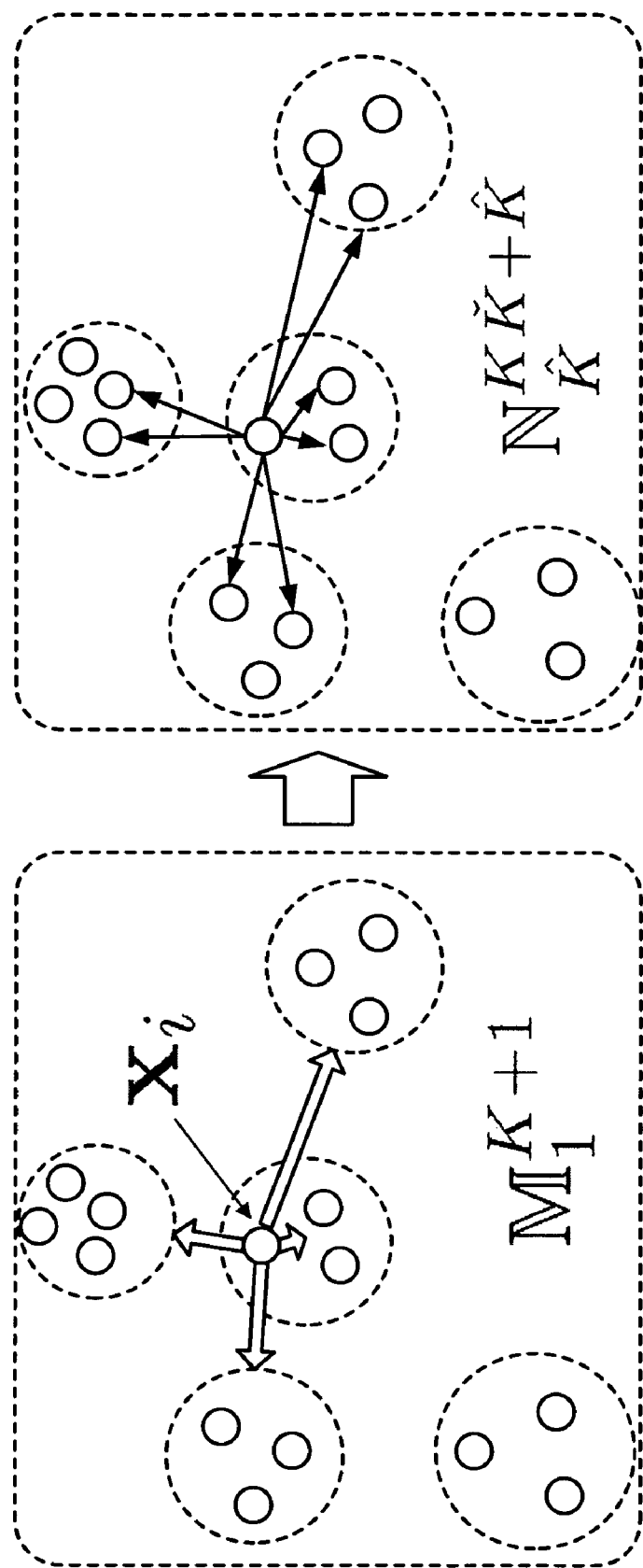
FIG. 2 is a representation of a semi-Riemannian submanifold and a corresponding ambient semi-Riemannian space.

The KNN classes of a sample are those classes (of number K) whose class centers are the closest, among all the available classes, to a given/selected sample. As described above, each sample is considered to have (K+1) degrees of discriminability, that is, K from its KNN classes, plus one degree that comes from the class to which that sample belongs. Such (K+1) degrees of discriminability can be conceived as a point on a (K+1)-dimensional manifold $M_1^{K+1}$. If its metric matrix is chosen as the following form:

$$G^M = \begin{bmatrix} \Lambda_{K \times K} & 0 \\ 0 & -\phi \end{bmatrix},$$

then $M_1^{K+1}$ is a semi-Riemannian manifold with index 1. FIG. 2 illustrates an example of $M_1^{K+1}$.

FIG. 2 shows the semi-Riemannian submanifold $M_1^{K+1}$ and its ambient semi-Riemannian space $M_{\check{K}}^{K\check{K}+\hat{K}}$. Here K=3, $\check{K}=\hat{K}=2$. The dots in the same general location in the submanifold $M_1^{K+1}$ and its ambient semi-Riemannian space $N_{\check{K}}^{K\check{K}+\hat{K}}$ belong to the same class.

The positive definite part of the metric matrix $G^M$ measures the between-class quantity, while the negative definite part measures the within-class quantity.

Figure 3:
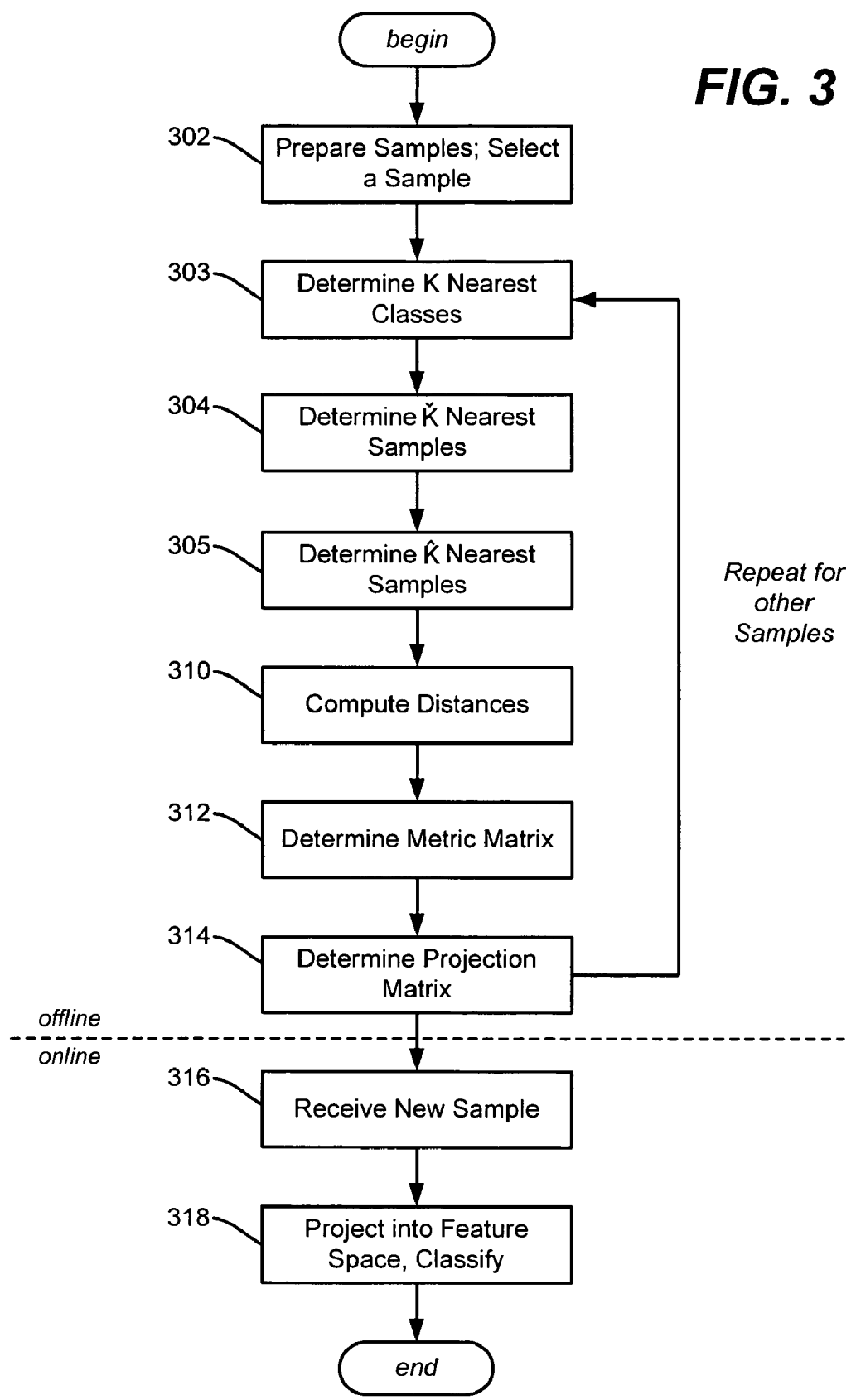
FIG. 3 is a flow diagram representing example steps for preparing and using semi-Riemannian spaces for classification

Turning to embedding discriminant manifolds into ambient semi-Riemannian spaces, FIG. 3 shows example steps generally corresponding to the components of FIG. 1. Steps 302-305 represent preparing samples and for each sample determining the K,$\hat{K}$,$\check{K}$ values as described above.

Based on the concept of discriminant manifold, the coordinates of points on $M_1^{K+1}$ need to be computed. Dissimilarities may be applied from each sample to its KNN classes and the class to which is belongs as the intrinsic coordinate. The between-class dissimilarity can be measured by the distances of this sample $x_i$ to $\check{K}$ samples in each of its KNN classes. The within-class dissimilarity can be measured by the distances (step 310) of this sample to $\hat{K}$ samples in the class to which it belongs. The between-class dissimilarities and the within-class dissimilarities may be represented as $$\left(\check{d}_{x_i x_{i_1}}^j, \check{d}_{x_i x_{i_2}}^j, \ldots, \check{d}_{x_i x_{i_{\check{K}}}}^j\right)^T (j=1, 2, \ldots, c)$$

and $$\left(\hat{d}_{x_i x_{i_1}}, \hat{d}_{x_i x_{i_2}}, \ldots, \hat{d}_{x_i x_{i_{\hat{K}}}}\right)^T,$$

respectively. Putting them together, $d_{x_i}=[\check{d}_{x_i}{}^T, \hat{d}_{x_i}{}^T]^T$ is used to represent the extrinsic coordinate of the point $x_i$ on the manifold $M_1^{K+1}$. As $d_{x_i}$ is a $(K\check{K}+\hat{K})$-dimensional vector, the process obtains a semi-Riemannian space $N_{\check{K}}^{K\check{K}+\hat{K}}$ furnished with the metric:

$$G^N = \begin{bmatrix} \check{\Lambda}_{(K\times \check{K})\times(K\check{K})} & 0 \\ 0 & -\hat{\Lambda}_{\hat{K}\times\hat{K}} \end{bmatrix},$$

which is the ambient space of $M_1^{K+1}$. In general, $K, \check{K}, \hat{K}$ are small positive integers. Thus, $N_{\check{K}}^{K\check{K}+\hat{K}}$ is a low-dimensional ambient space; the dimensions of $N_{\check{K}}^{K\check{K}+\hat{K}}$ and $M_1^{K+1}$ are independent of the dimension of the sample space.

Learning the discriminant subspaces is directed to determining the projection matrix U (step 314) from the original sample space to a low-dimensional space (called the feature space). To do so, the metric matrix of $N_{\check{K}}^{K\check{K}+\hat{K}}$ needs to be determined (step 312) in order to utilize the geometric property of $N_{\check{K}}^{K\check{K}+\hat{K}}$.

To compute U, the metric matrix of $N_{\check{K}}^{K\check{K}+\hat{K}}$ is needed. To this end, there is described a method to determine the metric matrix of $N_{\check{K}}^{K\check{K}+\hat{K}}$. In the following, it is assumed that the feature space is Euclidean, i.e., the norm of y in the feature space is defined as: $\|y\|_{l^2}^2 = y^T y$.

Suppose that the metric matrix $G_i^N$ at every sample point $x^i$ has already been determined. As described above, a goal of subspace learning is to maximize the between-class distance while minimizing the within-class distance. This can be accomplished by using the metric matrix $G_i^N$, i.e., by maximizing $$g(d_{y_i}, d_{y_i}) = d_{y_i}{}^T G_i^N d_{y_i} = \check{d}_{y_i}{}^T \check{\Lambda}_i \check{d}_{y_i} - \hat{d}_{y_i}{}^T \hat{\Lambda}_i \hat{d}_{y_i},$$

where $y_i$ is the low-dimensional representation of $x_i$. Then all such $g(d_{y_i}, d_{y_i})$ are summed at all samples to aim at maximizing:

$$\sum_{i=1}^m g(d_{y_i}, d_{y_i}),$$

which can be found to be:

$$\sum_{i=1}^m g(d_{y_i}, d_{y_i}) = tr(YLY^t), \quad (1)$$

where $$L = \sum_{i=1}^m S_i L_i S_i^T, \quad L_i = DG_i^N D^T, \quad S_i$$

is the binary selection matrix of size $m\times(K\check{K}+\hat{K}+1)$ whose structure is that $(S_i)_{pq}=1$ if the q-th vector in $Y_i$ is the p-th vector in Y, and D is the matrix of difference operator:

$$D = \begin{bmatrix} I_{(K\check{K}+\hat{K})\times(K\check{K}+\hat{K})} \\ -e^T_{K\check{K}+\hat{K}} \end{bmatrix}.$$

The technique of rewriting the left hand side of (1) as the right hand side of (1) is called alignment. It is well known in subspace learning theory that the matrix Y that maximizes (1) simply consists of the eigen-vectors of L corresponding to the first c largest eigen-values if c-dimensional nonlinear embedding of class structures are wanted. For isometric linear embedding, i.e., the sample vector and the feature vector are related as: $x=Uy$, where $U^T U=I_{c\times c}$, then U consists of the eigen-vectors of $XLX^T$ corresponding to the first c largest eigen-values.

The metric $G_i^N$ is a factor that governs the geometry of $N_{\check{K}}^{K\check{K}+\hat{K}}$. $G_i^N$ and includes two parts: the positive definite part $\check{\Lambda}_i$ and the negative definite part $-\hat{\Lambda}_i$.

To determine $\check{\Lambda}_i$, $\check{d}_{y_i}{}^T \check{\Lambda}_i \check{d}_{y_i}$ maybe written in the form of components:

$$\check{d}_{y_i}^T \check{\Lambda}_i \check{d}_{y_i} = \sum_{\check{k}=1}^{K\check{K}} \check{d}_{y_i}(\check{k}) \check{\Lambda}_i(\check{k}, \check{k}) \check{d}_{y_i}(\check{k}).$$

The larger component $\check{d}_{y_i}(\check{k}) \check{\Lambda}_i(\check{k},\check{k}) \check{d}_{y_i}(\check{k})$ suppresses the small ones when maximizing $g(d_{y_i}, d_{y_i})$. This can be overcome by balancing the magnitudes of $\check{d}_{x_i}(\check{k}) \check{\Lambda}_i(\check{k},\check{k}) \check{d}_{y_i}(\check{k})$, $\check{k}=1, \ldots, K\check{K}$, hoping that the components $\check{d}_{y_i}(\check{k}) \check{\Lambda}_i(\check{k},\check{k}) \check{d}_{y_i}(\check{k})$, $\check{k}=1, \ldots, K\check{K}$, are also balanced. Let $\check{g}_i=[\check{\Lambda}_i(1,1), \ldots, \check{\Lambda}_i(K\check{K},K\check{K})]^T$. Then $\check{d}_{x_i}{}^T \check{\Lambda}_i \check{d}_{x_i}=e^T \check{D}_{x_i} \check{g}_i$. The following criterion may be used to determine $\check{g}_i$ (hence $\check{\Lambda}_i$):

$$\begin{cases} \underset{\check{g}_i}{\operatorname{argmin}} \left\| \check{F} \check{D}_{\check{x}_i} \check{g}_i \right\|^2, \\ \text{s.t. } e^T \check{g}_i = 1, \end{cases} \quad (2)$$

where $\check{F}$ is the first difference operator:

$$\check{F} = [I_{(K\check{K}-1)\times(K\check{K}-1)} 0_{(K\check{K}-1)\times 1}] + [0_{(K\check{K}-1)\times 1} - I_{(K\check{K}-1)\times(K\check{K}-1)}].$$

To determine $\hat{\Lambda}_i$, after determining $\check{\Lambda}_i$, $\hat{\Lambda}_i$ can be determined accordingly by setting $N_{\check{K}}^{K\check{K}+\hat{K}}$ locally null: $g(d_{x_i}, d_{x_i})=0$, i.e., $\check{d}_{x_i}{}^T \check{\Lambda}_i \check{d}_{x_i} = \hat{d}_{x_i}{}^T \hat{\Lambda}_i \hat{d}_{x_i}$, for all samples $x_i$. Equivalently, $e_{K\check{K}}^T \check{D}_{x_i} \check{g}_i = e_{\hat{K}}^T \hat{D}_{x_i} \hat{g}_i$. As described above, also needed is the balanced magnitude of the components $\hat{d}_{y_i}(k) \hat{\Lambda}_i(k,k) \hat{d}_{y_i}(k)$, $k=1, \ldots, K\check{K}$. Thus, $\hat{g}_i$ (hence $\hat{\Lambda}_i$) may be determined in the following manner:

$$\begin{cases} \underset{\breve{g}_i}{\operatorname{argmin}} \left\| \breve{F} \breve{D}_{\breve{x}_i} \breve{g}_i \right\|^2, \\ \text{s.t. } e_{\breve{K}\breve{K}}^T \hat{D}_{x_i} \hat{g}_i = e_{\breve{K}}^T \breve{D} \breve{g}_i, \end{cases} \quad (3)$$

where $\hat{F}$ is the difference operator similar to $\breve{F}$. The solutions to (2) and (3) are respectively:

$$\breve{g}_i = \frac{\breve{D}_{x_i}^{-1} e_{\breve{K}\breve{K}}}{e_{\breve{K}\breve{K}}^T \breve{D}_{x_i}^{-1} e_{\breve{K}\breve{K}}} \text{ and } \hat{g}_i = \frac{e_{\breve{K}}^T \breve{D}_{x_i} \breve{g}_i}{\hat{K}} \hat{D}_{x_i}^{-1} e_{\breve{K}}. \quad (4)$$

The enforcement of nullity of $N_{\breve{K}}^{\breve{K}\breve{K}+\hat{K}}$ is in effect to balance the between-class scatter $\breve{d}_{x_i}^T \breve{\Lambda}_i \breve{d}_{x_i}$ and the within-class scatter $\hat{d}_{x_i}^T \hat{\Lambda}_i \hat{d}_{x_i}$, thus leading $G_i^N$ to be the baseline of determining the attribute of $N_{\breve{K}}^{\breve{K}\breve{K}+\hat{K}}$ for classification. The discriminability can be enhanced if the set $S_x$ of all samples is time-like in $N_{\breve{K}}^{\breve{K}\breve{K}+\hat{K}}$. This can be achieved by adjusting $\hat{\Lambda}_i$ and $\breve{\Lambda}_i$ in the following way:

$$\hat{\Lambda}_i \leftarrow \gamma \hat{\Lambda}_i, \breve{\Lambda}_i \leftarrow (1-\gamma)\breve{\Lambda}_i, \quad (5)$$

where $\gamma \in [0.5, 1]$.

With the above formulated framework using semi-Riemannian spaces, a specific algorithm, called semi-Riemannian Discriminant Analysis (SRDA), is provided for classification or discriminant subspace learning. The algorithm is summarized in Table 2, where the elements in $\breve{S}_{x_i}^j$ are determined by the nearest neighbor points in the j-th KNN class of $x_i$ and $\hat{S}_{x_i}$ by the nearest neighbor points of $x_i$ in class $\omega(x_i)$.

TABLE 2

Algorithm of SRDA:

1. For each $x_i$, search the NN point sets $\breve{S}_{x_i}$ and $\hat{S}_{x_i}$, record the index set $I_i$ of $S_{x_i}$, and form the dissimilarity vector $\breve{d}_{x_i}$ and $\hat{d}_{x_i}$.
2. Compute the metric matrix $G_i^N$ using Theorem 2, and form L by $L(I_i, I_i) \leftarrow L(I_i, I_i) + DG_i^N D^T$, where L is initialized by a zero matrix.
3. Obtain U by computing the eigenvectors of $XLX^T$ associated with the first d largest eigenvalues, and project samples: $Y = U^T X$.
4. Choose an optimal $\gamma$ in [0.5, 1] with the adaption $\hat{\Lambda}_i \leftarrow \gamma \hat{\Lambda}_i$ and $\breve{\Lambda}_i \leftarrow (1-\gamma)\breve{\Lambda}_i$ by cross validation.

Figure 4:
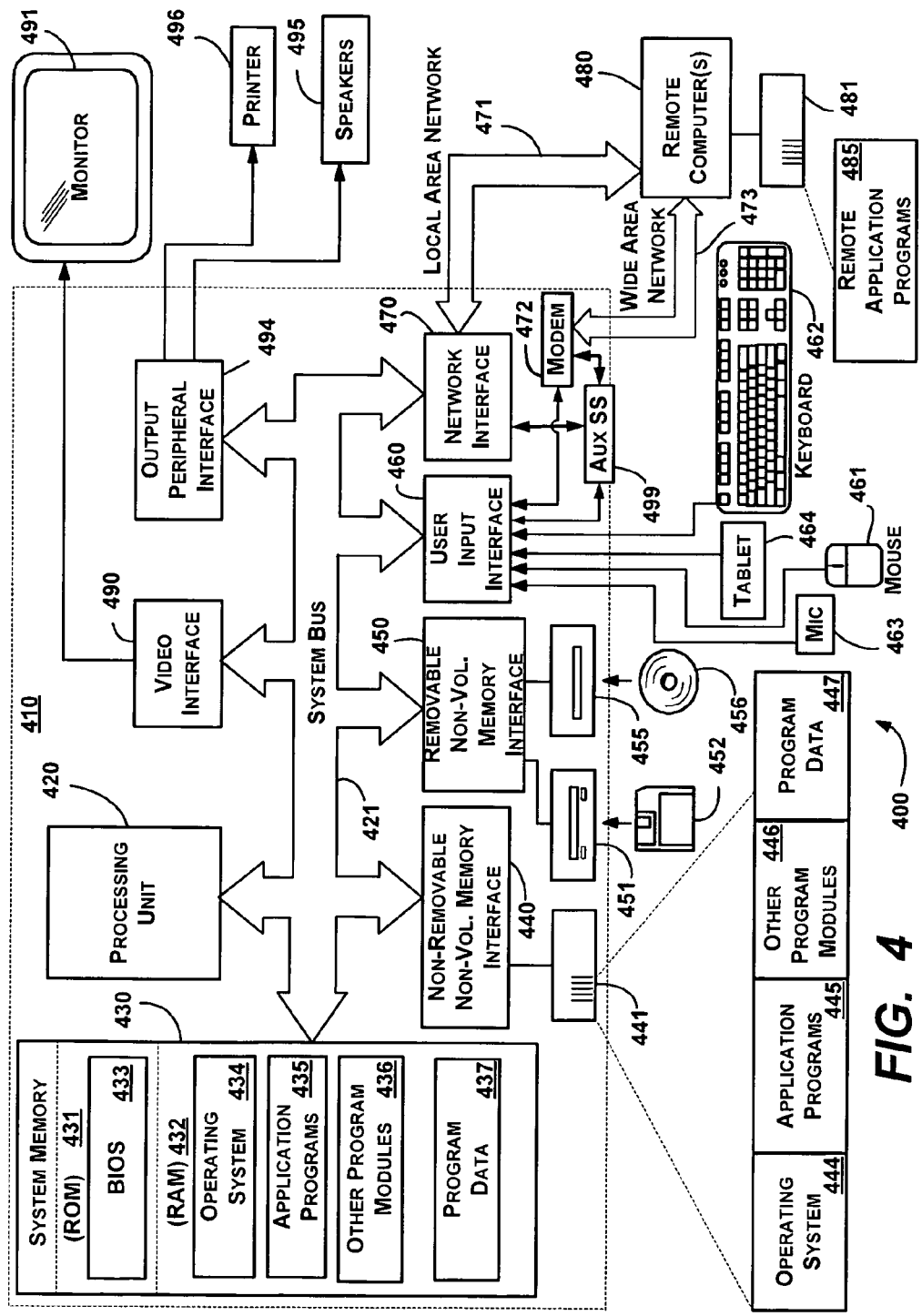
FIG. 4 shows an illustrative example of a computing environment into which various aspects of the present invention may be incorporated.

As represented in FIG. 3, steps 318 and 318 represent 4 Exemplary Operating Environment FIG. 4 illustrates an example of a suitable computing and networking environment 400 on which the examples of FIGS. 1-3 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during startup, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-implemented method comprising:
applying semi-Riemannian geometry, using a processor of a computer, to a set of labeled samples corresponding to supervised learning, including learning a discriminant subspace for classification by using at least some of the labeled samples to learn the geometry of a semi-Riemannian submanifold.

2. The method of claim 1 further comprising, for each sample, determining K nearest classes corresponding to that sample.

3. The method of claim 1 further comprising, for each sample, determining a set of nearest samples that correspond to that sample and that are in other classes.

4. The method of claim 1 further comprising, for each sample, determining a set of nearest samples that correspond to that sample and are within a same class as that sample.

5. The method of claim 1 further comprising, for a selected sample, determining a first set comprising nearest samples to that sample within a same class as that sample, determining a second set comprising nearest samples to that sample and are within a same class as that sample and that are in other classes, and computing distances between the selected sample and the samples of the first set, and between the selected sample and the samples of the second set.

6. The method of claim 1 wherein learning the discriminant subspace comprises computing a metric matrix.

7. The method of claim 6 wherein learning the discriminant subspace comprises using the metric matrix to compute a projection matrix.

8. The method of claim 7 further comprising, classifying a new sample by projecting the sample into a feature space via the projection matrix.

9. A system for obtaining a projection matrix from labeled sample data, the system comprising:
a processor; and
executable instructions, which, when executed by the processor, configure the system to:
compute distances between a selected sample, selected from the labeled sample data, and other samples of the labeled sample data,
compute a metric matrix based on the distances computed between the selected sample and the other samples, and
compute the projection matrix that corresponds to a discriminant subspace based on the metric matrix.

10. The system of claim 9 further comprising, a mechanism that determines K nearest classes corresponding to a sample.

11. The system of claim 9 further comprising, a mechanism that determines a set of nearest samples to a selected sample, in which the nearest samples are in other classes.

12. The system of claim 9 further comprising, a mechanism that determines a set of nearest samples to a selected sample, in which the nearest samples are in a class within which the selected sample is also in.

13. The system of claim 9 further comprising, a classifier that uses the projection matrix to project a new sample into a projection space for classification.

14. One or more computer-readable storage media having computer-executable instructions, which, when executed on a processor, perform a method comprising, learning a projection matrix for classification, including processing labeled samples to learn a semi-Riemannian submanifold geometry using the processor.

15. The one or more computer-readable storage media of claim 14 wherein learning the projection matrix comprises computing a metric matrix.

16. The one or more computer-readable storage media of claim 14 having further computer-executable instructions comprising, using the projection matrix to classify input data.

17. The one or more computer-readable storage media of claim 14 wherein learning the projection matrix comprises selecting a sample and determining K nearest classes corresponding to that sample.

18. The one or more computer-readable storage media of claim 14 wherein learning the projection matrix comprises selecting a sample and determining a set of nearest samples to that sample, in which the nearest samples correspond to other classes.

19. The one or more computer-readable storage media of claim 14 wherein learning the projection matrix comprises selecting a sample and determining a set of nearest samples to the selected sample, in which the nearest samples correspond to the selected sample's own class.

20. The one or more computer-readable storage media of claim 14 wherein learning the projection matrix comprises selecting a sample and computing distances between the selected sample and other samples.

* * * * *